United States Patent [19]

Iracane

[11] Patent Number: 5,351,248
[45] Date of Patent: Sep. 27, 1994

[54] FREE ELECTRON LASER WITH ADVANCED WIGGLER

[75] Inventor: Daniel Iracane, Palaiseau, France

[73] Assignee: Commissariat a l'Energie Atomique, Paris, France

[21] Appl. No.: 918,022

[22] Filed: Jul. 24, 1992

[30] Foreign Application Priority Data

Aug. 7, 1991 [FR] France ............... 91 10042

[51] Int. Cl.$^5$ ............... H01S 3/00
[52] U.S. Cl. ............... 372/2; 372/37; 315/5
[58] Field of Search ............... 372/2, 37; 315/5

[56] References Cited

U.S. PATENT DOCUMENTS

| | | | |
|---|---|---|---|
| 3,822,410 | 7/1974 | Madey | 372/2 |
| 4,461,004 | 7/1984 | Madey | 372/2 |
| 4,465,953 | 8/1984 | Bekefi | 315/5 |
| 4,466,101 | 8/1984 | Schoen | 372/2 |
| 4,876,687 | 10/1989 | Feinstein | 372/2 |

OTHER PUBLICATIONS

IEEE Transactions on Magnetics, vol. 24, No. 2, Mar. 1988, pp. 986–989, G. A. Deis, et al., "Electromagnetic Wiggler Technology Development at the Lawrence Livermore National Laboratory".

*Primary Examiner*—Leon Scott, Jr.
*Attorney, Agent, or Firm*—Oblon, Spivak, McClelland, Maier & Neustadt

[57] ABSTRACT

A free electron laser with an advanced wiggler. The wiggler is suitable for creating a transverse magnetic field with two periodicities (P1, P2). This thereby results in the emission spectrum being significantly reduced.

10 Claims, 7 Drawing Sheets

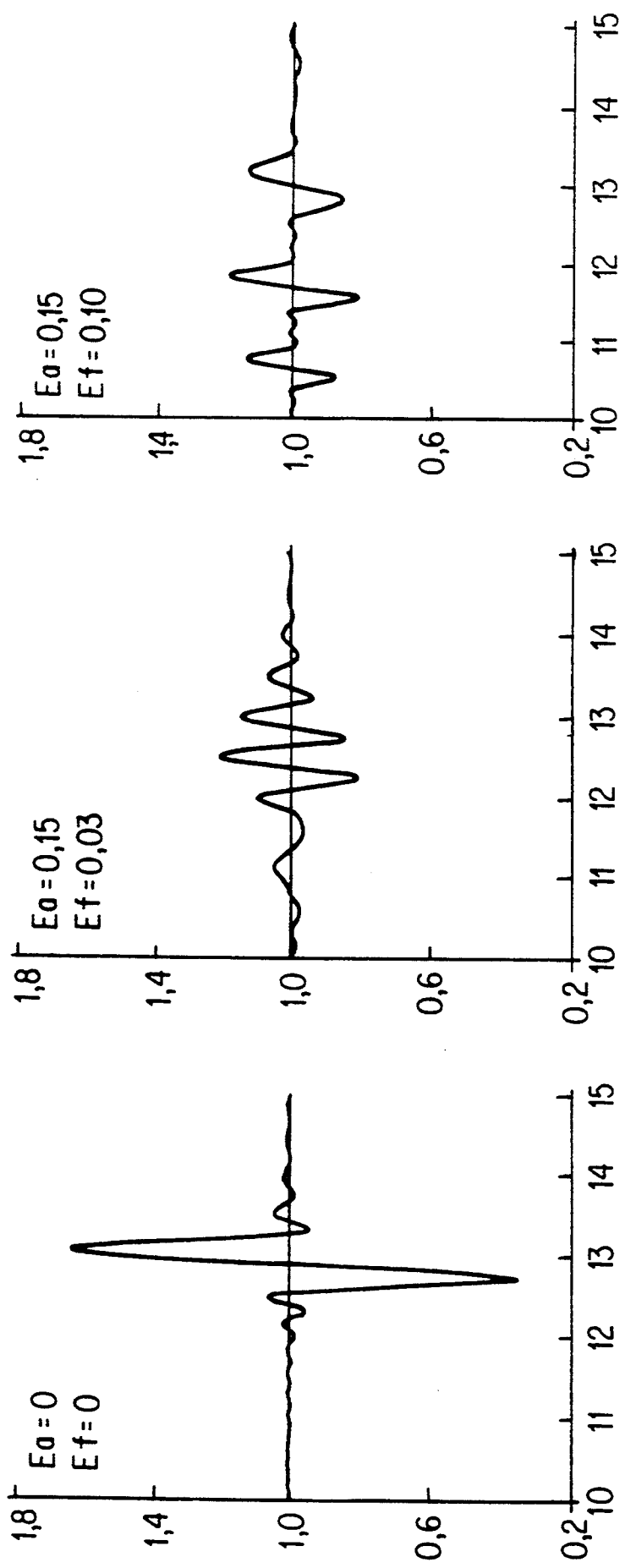

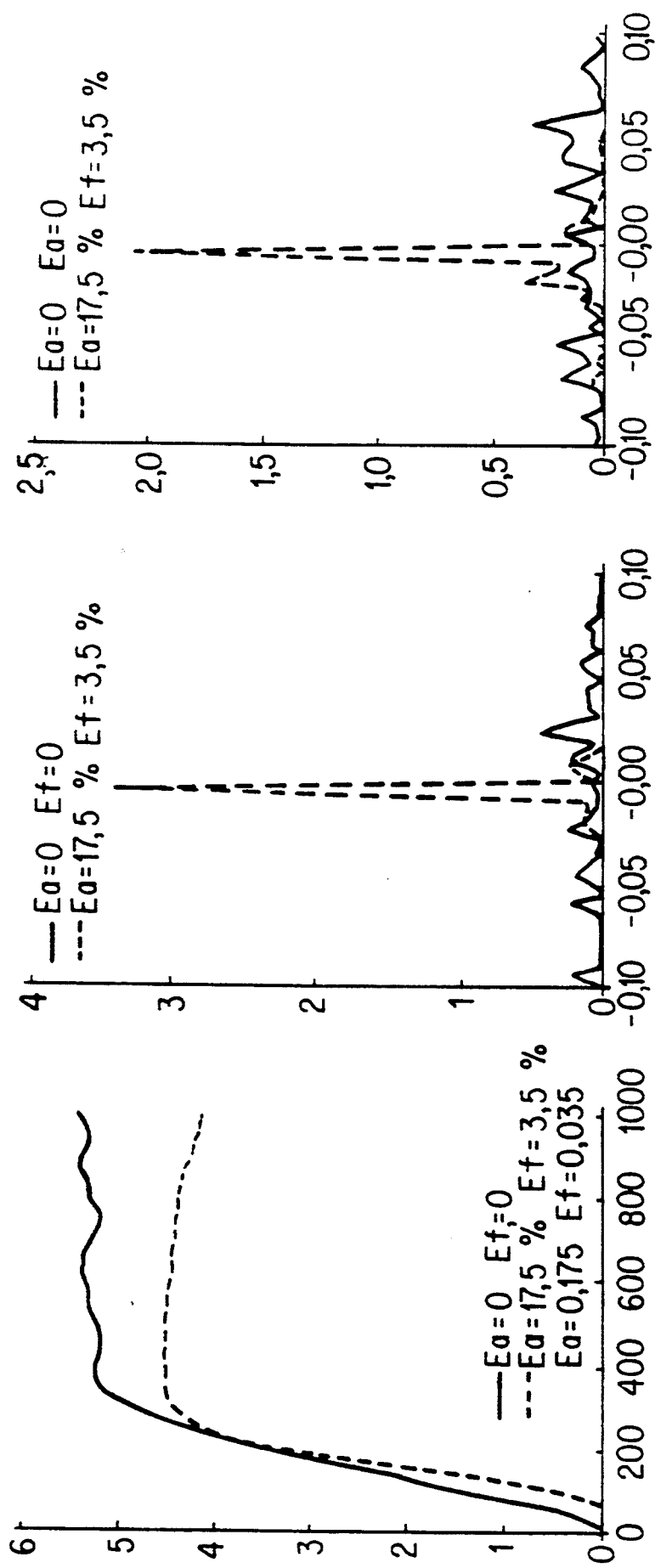

FREE ELECTRON LASER WITH ADVANCED WIGGLER

FIELD OF THE INVENTION

The present invention concerns a free electron laser with an advanced wiggler. It is able to be applied for the production of coherent radiations within a range extending from the submillimetric sphere to near infrared.

BACKGROUND OF THE INVENTION

A free electron laser diagrammatically includes an electron source and an accelerating structure so as to provide these electrons with relativist speeds and diverse deflectors making it possible to introduce the accelerated beam into a magnetic structure known as a wiggler. This wiggler is formed of varying magnets creating a transverse magnetic field, varying or periodic. The beam of electrons inside this wiggler undergoes deflections inside the plane perpendicular to the magnetic field. At the outlet, the beam of electrons is again deflected by a deflector and finally absorbed by an attenuator. Two mirrors may frame the wiggler.

The wiggler is the seat of an interaction between the beam of electrons and an electromagnetic wave created during deflections of the beam. If certain conditions are observed, the electromagnetic wave is amplified at the expense of the energy of the beam of electrons. An intense coherent electromagnetic field is then emitted by the structure.

A description of this device appears in the U.S. Pat. No. 3,822,410 granted to John M. J. MADEY.

Free electron lasers are remarkable radiation sources for two reasons in particular: firstly as they allow for wavelength tuning and secondly, as the amplificator medium is constituted by a beam of electrons in a vacuum, they are able to function at extremely high power without being the center of breakdown phenomena encountered in other types of lasers (solid, gas or liquid lasers).

However, these devices in certain applications do have one drawback. The spectrum of the radiation they emit is extremely wide and generally evolves chaotically from one passage to another in the wiggler. In any event, the width of the spectrum is determined by the manufacturer and in certain cases, it would be desired to be able to adjust this width so as to optimize it according to the application.

So as to obtain this result, it is possible to introduce into the interaction zone various wavelength selection means which are functionally equivalent to a monochromator. However, having done this, one of the advantages mentioned above would disappear, namely the absence of any equipment medium capable of impeding obtaining extremely high powers.

SUMMARY OF THE INVENTION

The object of the invention is to overcome this drawback. It makes it possible to obtain a spectrum much narrower than is the case in the prior art without it being necessary to add physical elements to the trajectory of the beam; in addition, it allows for an easy adjustment of the width of the beam.

To this end, the invention advocates of solely acting on the magnetic field produced in the wiggler. According to the invention, reduction of the width of the spectrum is obtained by using a particular wiggler able to create a magnetic field having a double periodicity (or a double "pitch", or, if it is desired to have a double "wavelength" if the periodic magnetic field is assimilated with a wave, or even a double "frequency", provided this word is given the meaning of "spatial frequency").

The existence of this double periodicity significantly modifies the wave/electrons conditions of interaction inside the wiggler and suprisingly causes a significant reduction of the spectral width of the emitted radiation.

More specifically, the present invention concerns a free electron laser including means to form a beam of electrons and means to introduce this beam along the axis of a wiggler, this wiggler including means to create along its axis a transverse magnetic field whose direction alternates along the axis, this laser being characterized by the fact that the wiggler includes means so that said magnetic field is the superposition of a first field whose direction alternates with a first periodicity along the axis and of a second field whose direction alternates with a second periodicity along the axis.

The two fields are preferably close as regards their periodicity but extremely different as regards their amplitude. The first field has a first periodicity P1 and a first amplitude B1 and the second a second periodicity P2 and a second amplitude B2, the relative difference (P2−P1)/P1 of the periodicities being about several percentages and the second amplitude B2 being about one tenth of the first B1.

DETAILED DESCRIPTION OF THE DRAWINGS

Figure 1:
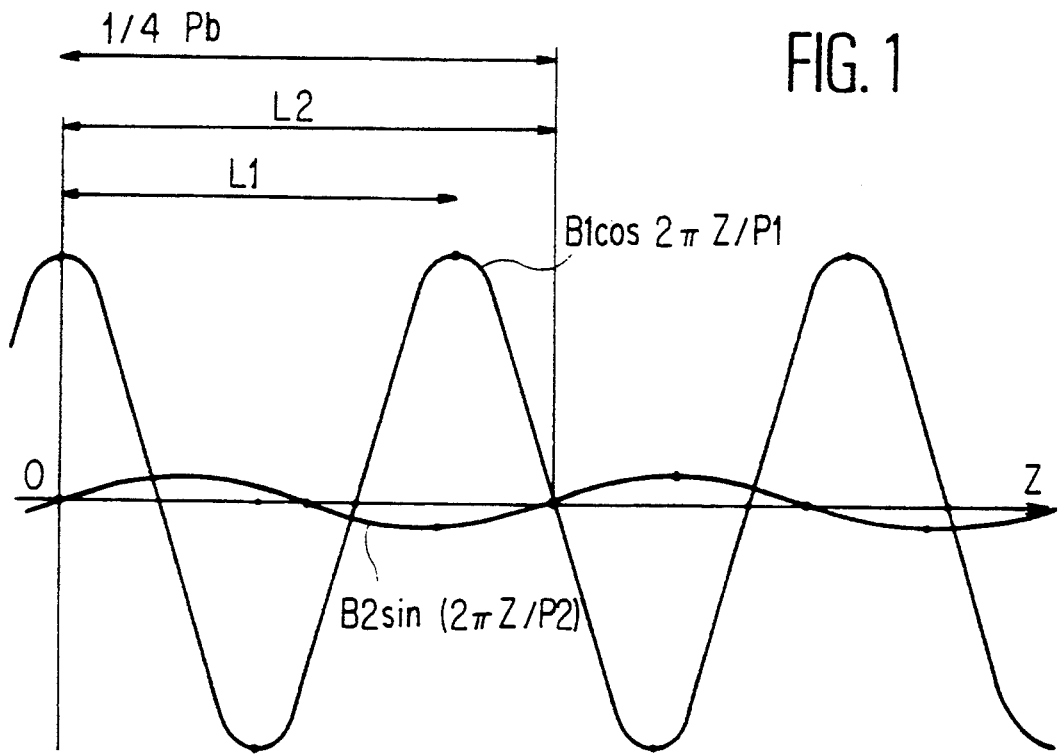
Figure 5:
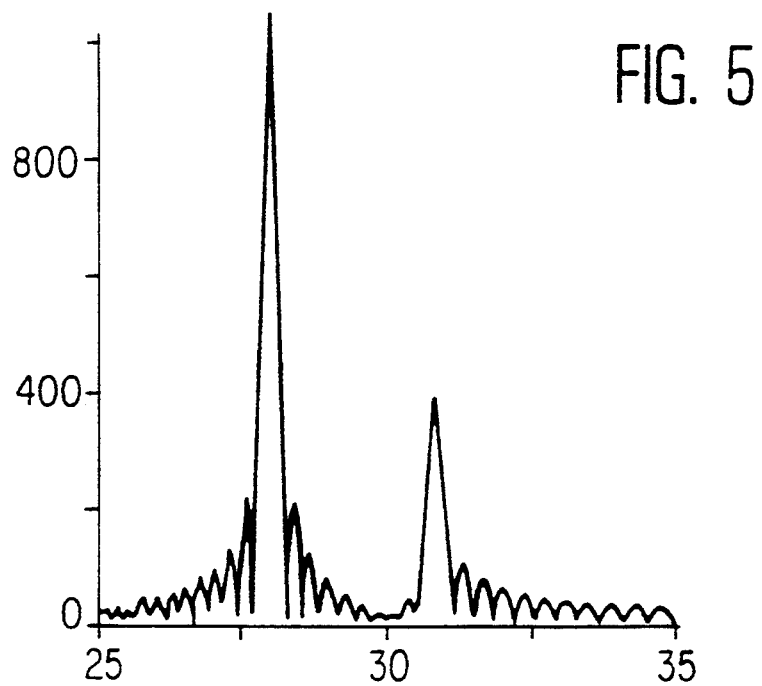
Figure 2:
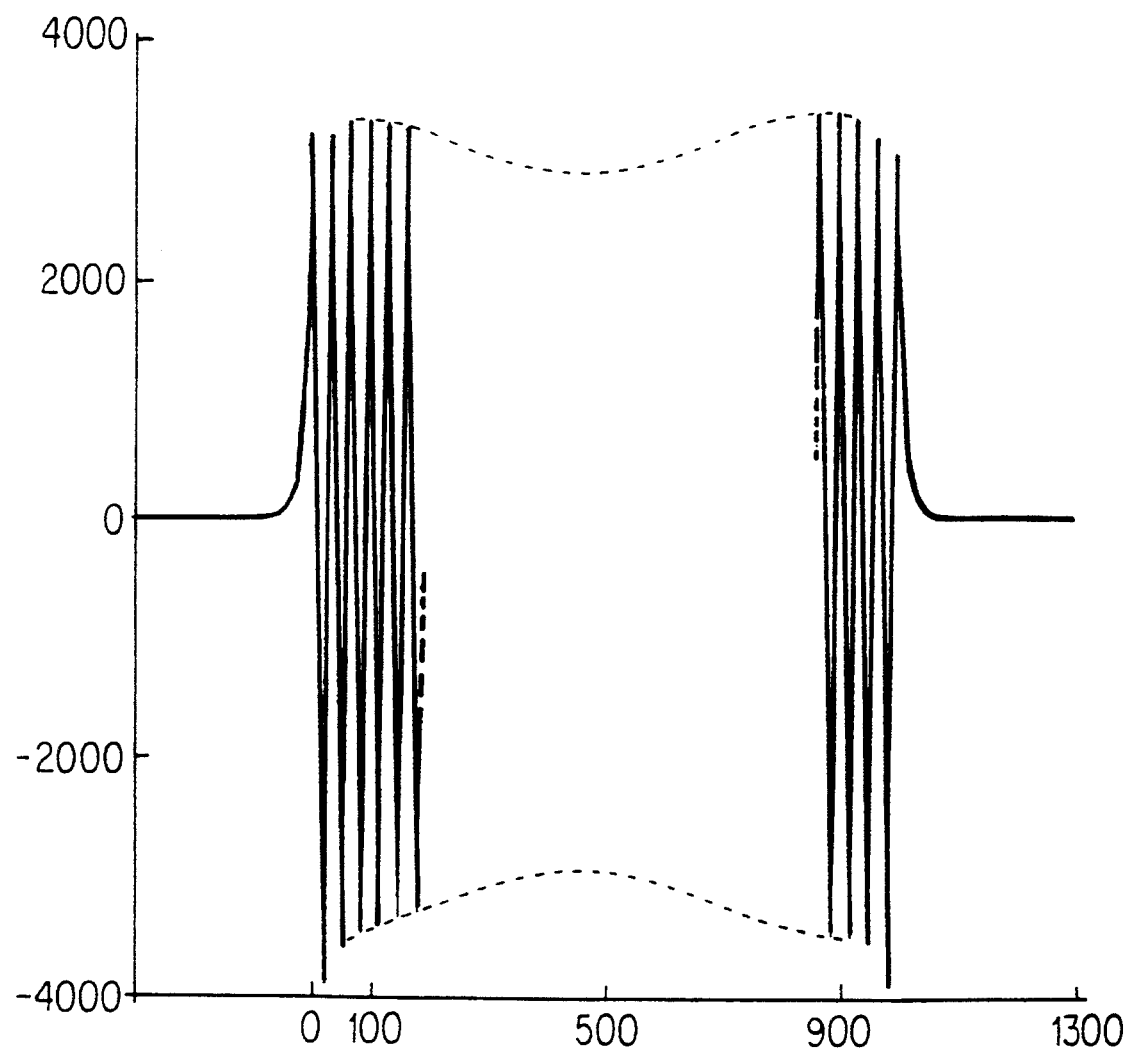
Figure 3:
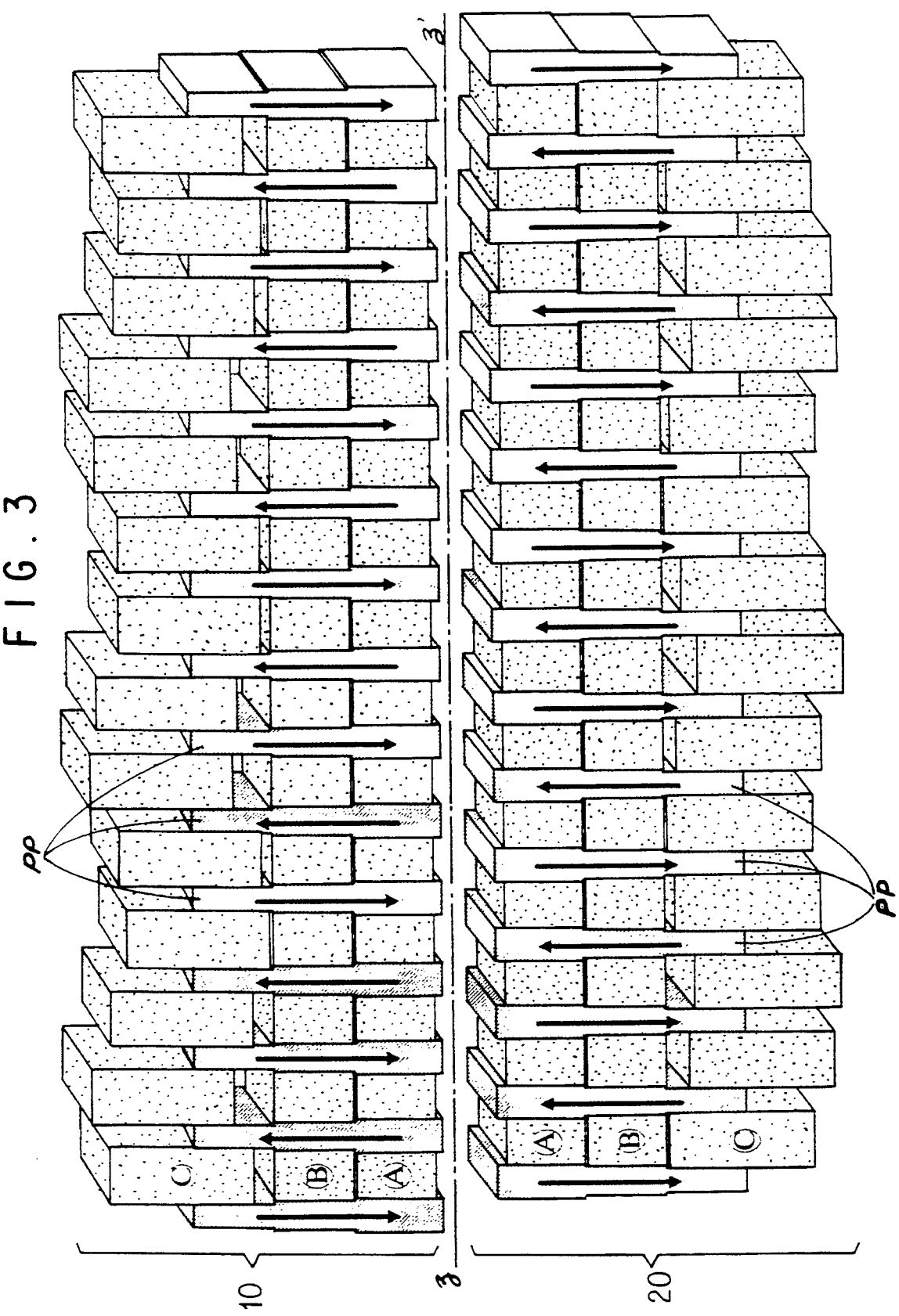
Figure 4:
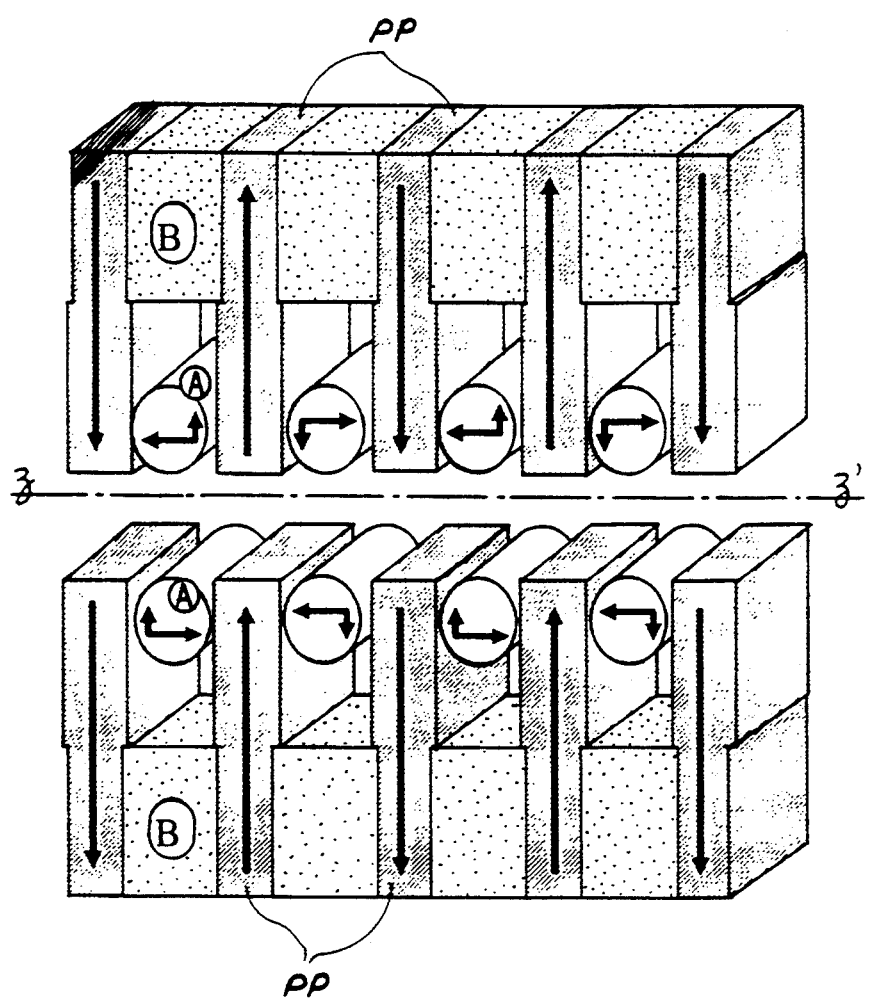
Figure 6C:
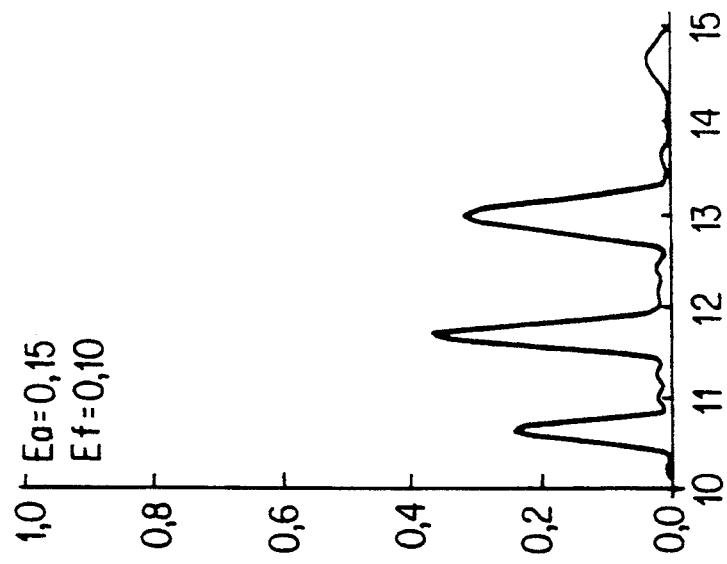
Figure 6B:
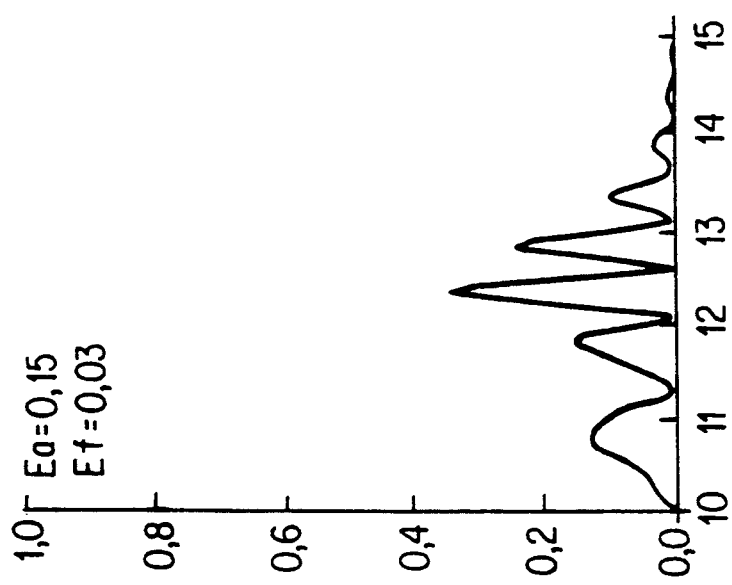
Figure 6A:
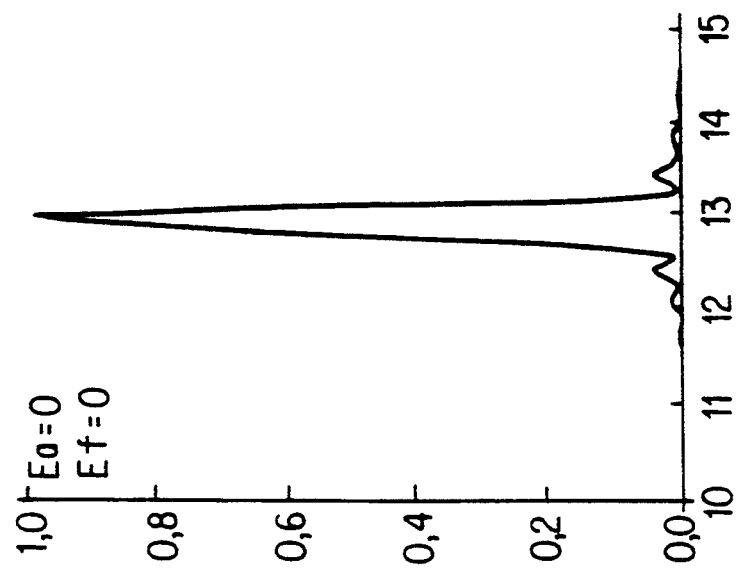

FIG. 1 diagrammatically shows two transverse magnetic fields with different periodicities, FIG. 2 shows a magnetic field reading in a wiggler conforming to the invention, FIG. 3 shows one first embodiment example of a wiggler conforming to the invention, FIG. 4 shows one second embodiment example of a wiggler conforming to the invention, FIG. 5 shows the spatial spectrum of the magnetic field in the wiggler, FIGS. 6a, 6b and 6c show the spontaneous emission spectrum for the prior art (6a) and for two particular distributions of the magnetic field according to the invention (6b, 6c), FIGS. 7a, 7b and 7c show the weak electromagnetic field amplification gain for the prior art (7a) and for two particular distributions of the magnetic field according to the invention (7b, 7c), FIG. 8 shows evolution of the yield of the laser according to the number of passages of the wave, FIGS. 9a and 9b show the relative frequency of the laser wave at the 500th passage (9a) and at the 1000th passage (9b) for the prior art and as regards the invention.

DETAILED DESCRIPTION OF THE PREFERRED EMBODIMENTS

According to the invention, the magnetic field created by the wave, if it is clearly still transverse with respect to the general axis of the wiggler as in the prior art, has one original feature of being the superposition of two transverse fields with different periodicities. It is of interest to describe the variation of the magnetic field of a wiggler along the axis of the latter by a sinusoidal function, even if this function is not strictly followed in practice. Thus, generally speaking, the transverse field is written in the following form $$B \cos(2\pi Z/P + \phi)$$

where B is an amplitude, Z is the distance along the axis and P the pitch of the field (or its period, or, if it is still desired to have its "wavelength" if the field is assimilated with a wave in space) and $\phi$ is a phase.

According to the invention, the field then has the form:

$$B1 \cos(2\pi Z/P1 + \phi 1) + B2 \cos(2\pi Z/P2 + \phi 2)$$

By analogy with vibratory phenomena having different frequencies, it is possible to define a "beating" between these two fields whose frequency is the difference of the spatial frequencies. Thus, it is possible to define a beating wavelength Pb, which is none other than the period of the overall resultant field of the superposition of two fields:

$$Pb = P1P2/P2 - P1.$$

Thus, the relative frequency difference Ef may also be defined by:

$$P2 = P1/(1 - Ef)$$

or $$Ef = (P2 - P1)/P2$$

as well as the relative amplitude difference Ea by:

$$Ea = B2/(B1 + B2),$$

or $$B2/B1 = Ea/(1 - Ea).$$

The relative amplitude difference expresses the relative amplitude of the second field with respect to the first one.

It is also possible to define standardized potentials by the expressions:

$$a1 = B1P1 \, e/mc2\pi$$

$$a2 = B2P2 \, e/mc2\pi$$

and a modulation depth m by:

$$m = -dPb/P1$$

with $d = 2a_1 a_2 / (1 + a_1^2 + a_2^2)$.

As for the phases $\phi 1$ and $\phi 2$, it is possible to take, but without this constituting a limitation of the invention, $\phi 1 = 0$ and $\phi 2 = \pi/2$ which amounts to considering that the field is the superposition of one cosine field and one sine field.

Thus, FIG. 1 diagrammatically shows one cosine field with an amplitude B1 and a period P1, and one sine field with amplitude B2 and a period P2.

In practice, the sine field has an amplitude much weaker than that of the cosine field but the periods P1 and P2 are similar to each other. This is what is roughly shown on FIG. 1.

More specifically, B2 is about one tenth of B1 (in practice, B2 is between 0.01 B1 and 0.3 B1). Similarly, the relative difference of the pitches P2−P1/P1 is about one tenth (in practice, between 0.01 and 0.1).

Thus, FIG. 1 shows a cosine field with period 16 arbitrary units and one sine field with a period of 20 units, which corresponds to a ratio Ef = (P2−P1)/P2 of 0.12 and a beating length Pb of 80 units.

So as to use a suitable terminology for radioelectricity, one could say that the magnetic field in the wiggler is the superposition of one "bearer wave" (in B1 cos $2\pi Z/P1$) modulated by a weaker wave with a frequency approaching B2sin $2\pi Z/P2$.

The wiggler has a length L. In the prior art, this length is equal to N times the single pitch P of the magnetic field (L = NP). In the case of the invention, the length L of the wiggler may be equal to the beating wavelength Pb or to a multiple of the latter.

FIG. 2 is a reading of the transverse magnetic field in a wiggler with double periodicity according to the invention. The axes of the abscissae corresponds to the longitudinal axis of the wiggler. The units are in millimeters. In the case shown, the wiggler has a length of one meter. FIG. 2 clearly shows the "beating" of the two fields, the wavelength of the beating being in the case shown slightly smaller than the total length of the wiggler.

So as to embody the wiggler of the invention, it is possible to mainly use the known techniques of the prior art. Concerning the general technology relating to wigglers, it is possible to cite the article by G. A. DEIS and al of the Lawrence Livermore National Laboratory and by K. HALBACH of the Lawrence Berkeley Laboratory and entitled "Electromagnetic Wiggler Technology Development at the Lawrence Livermore National Laboratory" published in the IEEE journal concerning Transactions on Magnetics, vol. 24, No 2, March 1988, p. 986–989.

So as to embody a wiggler with double periodicity, it is possible to also make use of knowledge of known solutions so as to modify the parameters of a wiggler. Thus, it is possible to embody wigglers with alternate permanent magnets and pole pieces disposed between the magnets in a particular configuration, known as the HALBACH configuration. The magnets may be moved transversally so as to adjust the magnetic field opposite the corresponding pole pieces.

Thus, it is possible to adjust either the gap between pole pieces or the amplitude of the magnetic field along the axis of the wiggler, for example, so as to progressively taper this field. Reference may be made here to the article by Mark CURTIN and al and entitled "Initial Results of Operating The Rocketdyne Undulator in a Tapered Configuration" published in the journal Nuclear Instruments and Methods in Physics Research A 296 (1990) p. 69–74, or the article by N. M. KROLL and al and entitled "Free-Electron Lasers with Variable Parameter Wigglers" published in the IEEE review Journal of Quantum Electronics, vol. QE-17, No 8, August 1981. However, it ought to be mentioned that a tapered field wiggler is not a wiggler with double periodicity as the one in the invention.

The authors of the documents mentioned above qualify tapering of the field as adiabatic. By analogy and as opposed to the above, the particular profile with frequency beating given to the field in the laser of the invention (FIG. 2) may be qualified as "nonadiabatic".

FIG. 3 shows one first possible embodiment of a wiggler with double periodicity. The wiggler shown here includes two sub-units 10 and 20 disposed symmetrically on both sides of the axis zz'. Each unit includes pole pieces PP, for example made of soft iron, between which permanent magnets are inserted. Each of these magnets comprise close to the axis one or several portions, such as A (and B) close to the axis zz' and accurately positioned with respect to the pole pieces and the axis, as well as a portion C distanced from the axis, the distance from the portion C to the axis being adjustable. The magnetic flux in the pole pieces PP is symbolized by vertical arrows. Moreover, the sub-units 10 and 20 may be moved with respect to each other in the direction of the axis zz' by means (not shown) which are essentially two horizontal frames to which the two sub-units are secured.

FIG. 3 shows the sub-units 10 and 20 being 90° out of phase. This point is fundamental so as to obtain the cosine and sine elements required for the invention, failing which a single amplitude modulation would create three frequencies instead of two. By adjusting the position of the portion C of the magnets, it is possible to adjust the pitch of the beating and its amplitude.

FIG. 4 shows a variant in which one portion A of the magnets situated close to the axis zz' is constituted by a cylinder and another portion B distanced from the axis and having a parallelpiped shape. In the cylinder A, the magnetic field is orientated according to the vector sum of the two fields represented by arrows. These cylindrical magnets are all identical and are rotated by one half-turn with respect to one another.

It is also possible to partly or fully replace the permanent magnets by small conductive coils equipped with a magnetic core.

FIG. 5 shows a curve representing the spatial distribution of the various elements of the magnetic field obtained with the wiggler of the invention, otherwise known as the (spatial) spectrum of the field.

This curve is none other than the FOURIER spatial transform of the field. This spectrum includes one first peak at 28.4 mm (which corresponds to the first periodicity P1 of the first cosine field) and a second peak, less intense, at about 31 mm (which corresponds to the second periodicity P2 of the second sine field).

The width of the peaks in linked to the finished length of the wiggler. The longer the wiggler is, the narrower are these peaks.

This spectrum has been obtained on a HALBACH wiggler constituted by alternate permanent magnets and whose amplitude has been modulated.

FIGS. 6a, 6b and 6c show the variation of the spontaneous luminous intensity according to the wavelength (expressed in microns). FIG. 6a corresponds to the prior art, that is to a relative frequency Ef as nil (P2=P1) and a relative amplitude frequency Ea, also nil (B2=B1). This spectrum corresponds to the normal sine x/x function.

According to the invention, when the pitches and amplitudes of the two elements differ, new peaks appear inside the spectrum. FIG. 6b corresponds to the case where Ea=0.15 and Ef=0.03. As a first approximation, these peaks are separated by an interval equal to the reciprocal value of the beating wavelength. When the relative frequency difference Ef increases and moves to 0.10 (for a given relative amplitude difference of 0.15), the spectrum has several peaks separated as far as possible (FIG. 6c).

By virtue of considerations arising from this description, it is possible to generally demonstrate that the spectrum obtained is a sum of peaks offset with respect to a central peak, the weight of the peak on the row n being linked to the BESSEL function of the row n, Jn(m), the variable quantity being the modulation rate m. When the modulation rate is nil, only one peak is present (n=0). As soon as the rate increases, other peaks appear with the row ±n and the peak corresponding to n=0 may be rapidly dominated by the lateral peaks corresponding to n=1, n=2, etc.

The relative difference between the various peaks is proportional to the relative frequency difference Ef and thus depends on the beating period Pb, whereas the width of the peaks is linked to the length of the wave. In the case where Ef is sufficiently large (which corresponds to one beating pitch much smaller than the length of the wave), the peaks do not interfere with one another. This is the case on FIG. 6c where one can clearly see three peaks. On the other hand, if the beating pitch is about the length of the wave, there is interference between the peaks and the spectrum is more complex (FIG. 6b).

FIGS. 7a, 7b and 7c show the amplification gain according to the wavelength (expressed in microns) in the case of a supposedly weak signal, the rating supposedly being linear. This rating makes it possible to characterize the functioning of the laser with a weak signal. It is then possible to connect the linear amplification gain with a weak signal to the spontaneous radiation in the wiggler, as in the case of free electron lasers in the prior art where this link between amplification gain and spontaneous radiation is sometimes denoted by the "MADEY theorem".

FIG. 7a again corresponds to the case of the prior art (Ea=0, Ef=0), the gain curve being a conventional curve as illustrated in the American patent mentioned earlier and granted to J. MADEY.

The curve of FIG. 7b corresponds to Ea=0.15 and Ef=0.03. This case, already discussed with reference to FIG. 6b, corresponds to a beating length comparable to the length of the wiggler.

For the curve of FIG. 7c, Ea=0.15 and Ef=0.10 and the beating length is much smaller than the length of the wiggler. The gain is then broken down into three distinct zones. Each approximately corresponds to the conventional case but to three different wavelengths (respectively to 10.6 μm, 11.6 μm and 13 μm).

Between the situation of the prior art (FIG. 7a) and that of FIG. 7c, the situation of FIG. 7b is less clear as the various zones interfere. The case of FIG. 7b is thus potentially rich with consequences and constitutes the favored functioning zone of the invention.

In the laser saturation condition, the situation becomes slightly less complex as the presence of the magnetic field beating significantly modifies electron/photon interaction. It is known that in a conventional free electron laser, the linked stable trajectories induce satellite lines (called "sidebands") in the radiation, the origin of the lines being a spectral broadening observed after several hundreds of passages (as explained in the article by D. IRACANE and J. L. FERRER published in "Physical Review Letters", vol. 66 (1991), 33). A destablilization of the trajectories seems to be created by the second periodicity of the field in the wiggler of the invention, which disturbs and thus limits amplification on these satellite lines and accordingly results in a limitation of spectral broadening.

FIGS. 8 and 9a and 9b show the results obtained.

Firstly, FIG. 8 shows the extraction yield R, that is the laser energy extracted from the optical cavity with respect to the electronic energy. This yield is expressed in percentage terms. FIG. 8 shows both the yield for a laser of the prior art (curve shown by the full lines) and this yield for a laser conforming to the invention in the case where Ea=0.175 and Ef=0.035. In abscissae, the figure shows the number of passages of the laser wave in the wiggler.

It can be seen that the yield on saturation remains close to 4%, which is slightly less than the yield with conventional lasers, namely about 5%. The invention does not offer anything beneficial in this respect. But, as regards the yield expressed according to the frequency, the results make the most of the invention as shown by FIGS. 9a and 9b. These figures show that the yield is entered in ordinates and in abscissae the relative frequency of the wave with respect to the main frequency. These curves are therefore accuracy curves. FIG. 9a corresponds to the 500th passage of the wave and FIG. 9b to the 1000th passage. The curve shown by the full lines corresponds in both-cases to the prior art and the curve shown by the dot-and-dash lines to a laser conforming to the invention with Ea=0.175 and Ef=0.035.

The spectacular modification obtained by means of the invention means that the emission spectrum is much narrower. The introduction of double periodicity in the wiggler (or, if desired, a beating or modulation of the magnetic field) induces marked effects on the emission spectrum of the laser, this significantly reducing the width of this spectrum.

The extremely simple modification to be made of the location of the magnets in structures of the type of those of FIGS. 3 and 4 makes it possible to adjust the width of the spectrum.

What is claimed is:

1. Free electron laser including means to form a beam of electrons and introduce this beam along the axis of a wiggler, this wiggler including means to generate along the axis of the wiggler a transverse magnetic field whose direction alternates periodically along the axis of the wiggler, wherein the wiggler includes means for generating the magnetic field so that said magnetic field is the superposition of one first field whose direction alternates with one first periodicity along the axis of the wiggler and a second field whose direction alternates with a second periodicity along the axis of the wiggler.

2. Free electron laser according to claim 1, 15 wherein the first field has one first periodicity P1 and one first amplitude B1 and the second field one second periodicity P2 and one second amplitude B2, the relative difference (P2−P1)/P1 of the periodicities about several percentages and the second amplitude B2 is about one tenth of the first amplitude B1.

3. Free electron laser according to claim 1, wherein the wiggler includes one first and one second sub-unit placed symmetrically with respect to the axis of the wiggler, each sub-unit being formed of a periodic alternance of pole pieces and means for creating a magnetic field, these two sub-units being offset with respect to each other in the direction of the axis.

4. Free electron laser according to claim 3, wherein the means to create a magnetic field are permanent magnets.

5. Free electron laser according to claim 4, wherein each permanent magnet includes one portion situated close to the axis of the wiggler and one portion distanced from the axis, the distance to the axis from this portion being adjustable.

6. Free electron laser according to claim 4, wherein each magnet includes one cylindrical portion disposed close to the axis and one parallelpiped-shaped portion distanced from the axis, the distance to the axis from this parallelpiped-shaped portion being adjustable.

7. A free electron laser for generating a laser beam and introducing the laser beam along a predetermined axis of a wiggler, the wiggler generating a magnetic field and comprising:
    first and second sub-units disposed symmetrically along the predetermined axis, each of the first and second sub-units comprising:
    a plurality of pole pieces;
    a plurality of permanent magnets alternating with the plurality of pole pieces;
    wherein the first and second sub-units are offset by ninety degrees; and
    wherein the first sub-unit generates a first field of a first periodicity and the second sub-unit generates a second field of a second periodicity, the first and second fields being superposed to generate the magnetic field of the wiggler.

8. The free electron laser according to claim 7, wherein each permanent magnet comprises a first portion and a second portion, wherein the fist portion is closer to the predetermined axis than the second portion, and wherein a distance from the second portion to the predetermined axis is adjustable.

9. The free electron laser according to claim 8, wherein each permanent magnet comprises a cylindrical portion and a parallelpiped-shaped portion, wherein the cylindrical portion is situated closer to the predetermined axis than the parallelpiped-shaped portion, and wherein a distance from the parallelpiped-shaped portion to the predetermined axis is adjustable.

10. The free electron laser according to claim 7, wherein each permanent magnet comprises a cylindrical portion and a parallelpiped-shaped portion, wherein the cylindrical portion is situated closer to the predetermined axis than the parallelpiped-shaped portion, and wherein a distance from the parallelpiped-shaped portion to the predetermined axis is adjustable.

* * * * *